H. W. B. GRAHAM.
BUMPING MECHANISM.
APPLICATION FILED APR. 15, 1918.
1,350,604.
Patented Aug. 24, 1920.
3 SHEETS—SHEET 1.
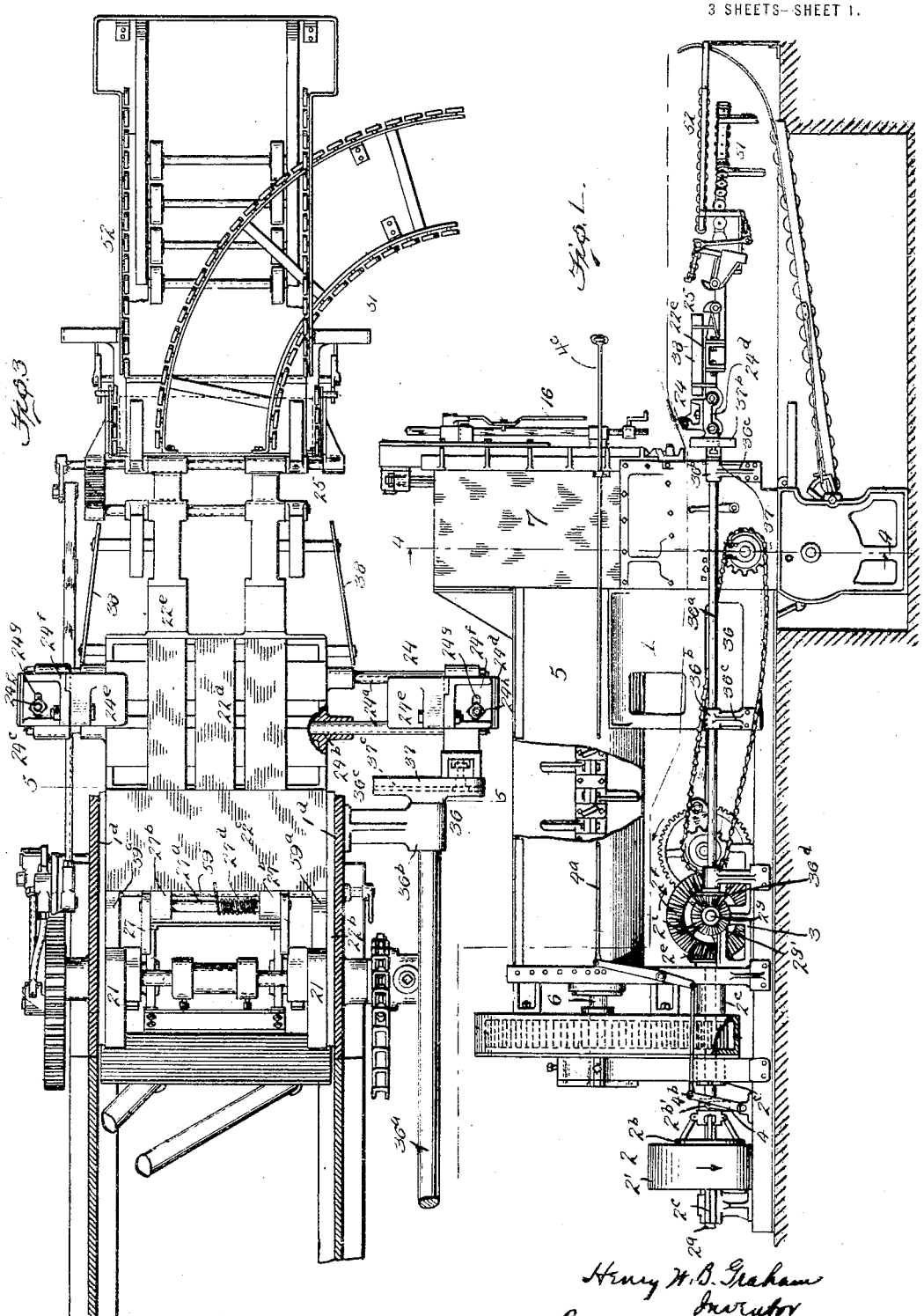

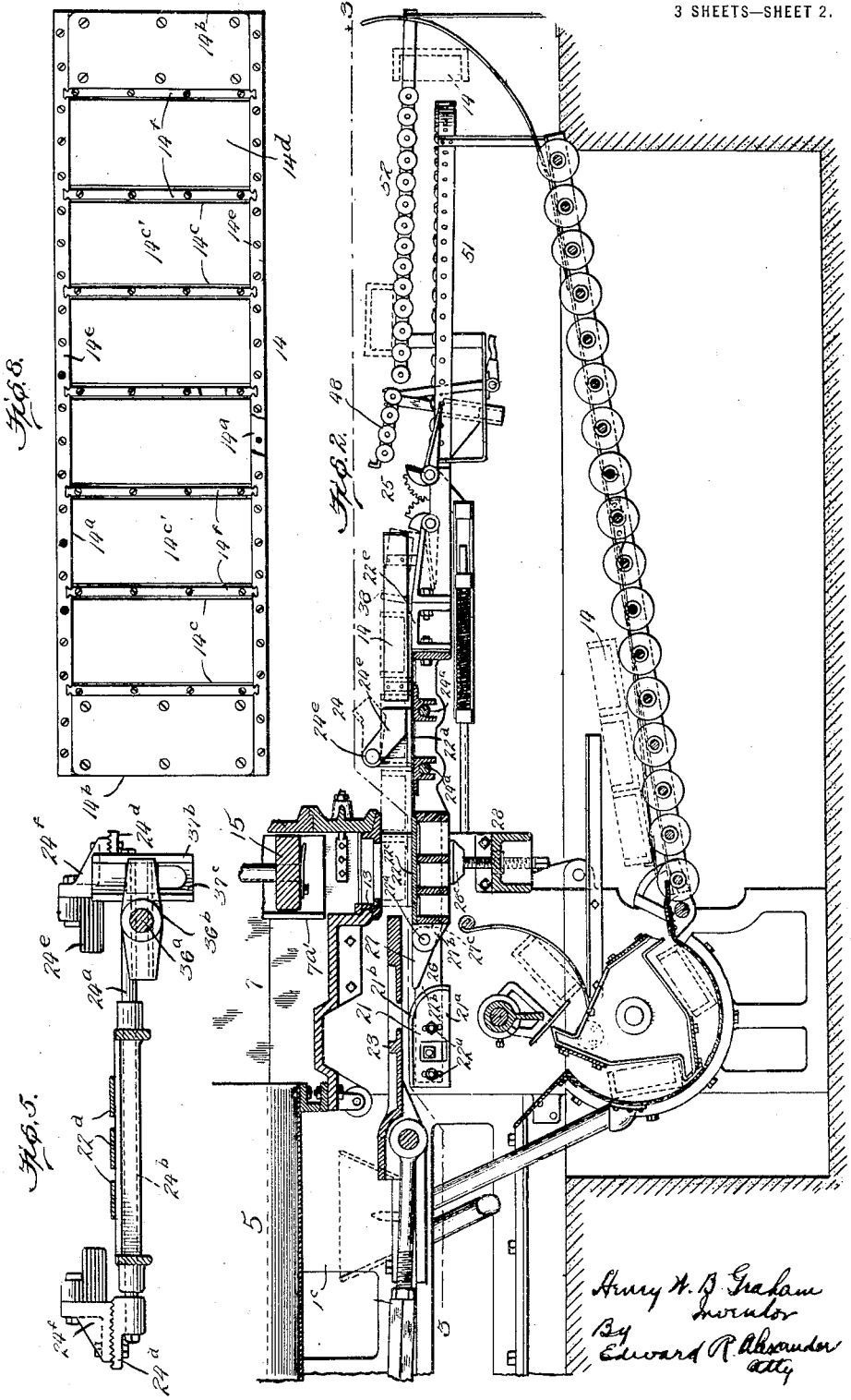

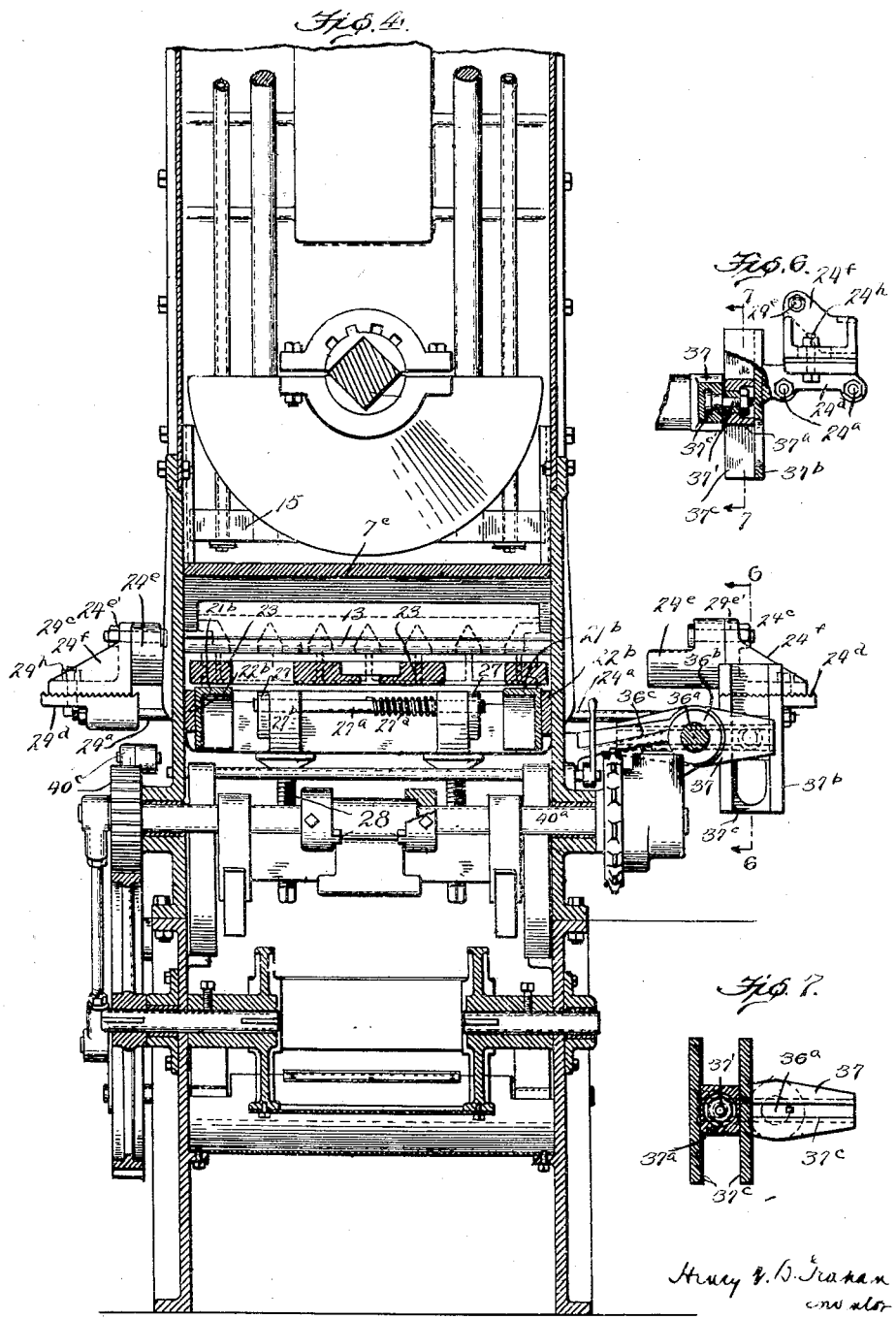

UNITED STATES PATENT OFFICE.

HENRY W. B. GRAHAM, OF NEW LONDON, OHIO, ASSIGNOR TO THE ARNOLD-CREAGER COMPANY, OF NEW LONDON, OHIO, A CORPORATION OF OHIO.

BUMPING MECHANISM.

1,350,604.  Specification of Letters Patent.  Patented Aug. 24, 1920.

Original application filed March 1, 1916, Serial No. 81,425. Divided and this application filed April 15, 1918. Serial No. 228,640½.

*To all whom it may concern:*

Be it known that I, HENRY W. B. GRAHAM, a citizen of the United States, residing at New London, in the county of Huron and State of Ohio, have invented certain new and useful Improvements in and Relating to Bumping Mechanism, of which the following is a specification.

This invention relates to apparatus for making bricks.

One object of the invention is to provide an improved mechanism for bumping filled brick molds.

Another object of the invention is to correlate with a brick molding apparatus improved mold bumping mechanism.

Another object of the invention is to provide improved bumping mechanism having mold engaging members which are adjustable for proper engagement with the molds.

Another object of the invention is to provide a bumping mechanism in which the mold engaging members are pivotally mounted and adapted to be swung laterally by a mold to permit the latter to be properly positioned.

Other objects of the invention will be apparent to those skilled in the art from the following description, taken in connection with the accompanying drawings.

This application is a division of an application filed by me on the 1st day of March, 1916, Ser. No. 81,425.

For the purpose of illustration, I have, in the accompanying drawings shown and herein described one form of apparatus embodying my invention.

In the drawings, Figure 1 is a side elevation of a brick molding apparatus and a bumping mechanism embodying my invention.

Fig. 2 is a longitudinal section through the forward part of the apparatus showing the mold filling mechanism, mold push-out, bumping mechanism, mold inverting and separating devices, the conveyers for the bricks and empty molds and the sanding mechanism.

Fig. 3 is a section on the line 3—3 of Fig. 2.

Fig. 4 is a fragmentary section, enlarged, on the line 4—4 of Fig. 1.

Fig. 5 is a fragmentary section on the line 5—5 of Fig. 3.

Fig. 6 is a section on the line 6—6 of Fig. 4.

Fig. 7 is a section on the line 7—7 of Fig. 6.

Fig. 8 is a plan view of one of the mold block units.

In the drawings, 1 indicates as an entirety the frame work for the apparatus.

2 indicates as an entirety the driving mechanism, including a shaft $2^a$, for the apparatus. The driving mechanism 2 comprises a shaft $2^a$ mounted in suitable bearings $2^c$, $2^c$, $2^{c'}$. $2'$ indicates a pulley adapted to communicate motion to the shaft $2^a$ through a suitable clutch $2^b$. At its forward end the shaft $2^a$ carries a bevel pinion $2^e$, which meshes with and drives a bevel gear $2^f$ fixed to a transverse shaft $2^g$. The shaft $2^g$ is supported at or near its opposite ends in suitable bearings, which are provided in arms $2^{g'}$ of base blocks 3. The blocks 3 are rigidly supported on the frame in any suitable manner. At one end, the shaft $2^g$ carries a spur gear $2^{h'}$ and at its opposite end it carries a bevel gear $2^i$. The purpose of these gears will be later described.

$4^a$ indicates a set of connected links and rods connected at one end to the opposite end of a lever 4, which is connected to the clutch $2^b$; the connected links and rods extend to the front end of the apparatus where it is provided a handle $4^c$, by means of which the operative is enabled to start and stop the apparatus.

5 indicates as an entirety a pug mill.

13 indicates a die preferably of rectangular shape and heavily constructed to withstand the strains to which it is subjected. The lower surfaces or edges of the die 13 are preferably flat in order to engage with the upper surface of each mold, indicated at 14, when positioned for filling. The front lower wall of the die 13 operates to scrape the surplus material from the mold top in a manner well known to those skilled in the art to which my invention relates, as the mold is pushed forwardly after being filled.

In the use herein of the term "mold" I wish to be understood to mean a mold in which one or a plurality of mold sections are provided. In practice, it will be found desirable, for obvious reasons, to provide a plural section mold, such as I have chosen to illustrate in the accompanying drawings. Each mold 14 may be of rectangular shape and comprise a pair of side members $14^a$, and a pair of end members $14^b$ each connected to adjacent ends of the side members $14^a$. $14^c$ indicates a plurality of partitions uniformly spaced from each other and the inner walls of the end members $14^b$ to divide the mold into a plurality of sections $14^{c'}$, each of which forms a brick mold. $14^d$ indicates a plurality of bottoms one for each mold section $14^{c'}$. The bottoms $14^d$ are preferably spaced from each other a distance slightly greater than the thickness of each partition so as to provide vents. When the mold sections are being filled, the air therein is forced out through these vents; on the other hand, when the mold 14 is dumped, air has access to the under side of the bricks to prevent a vacuum. The end members $14^b$ for the molds comprise blocks which are preferably of rectangular shape in cross section. The blocks $14^b$ are of a size to provide relatively wide upper and lower surfaces which serve as shoes on which the mold 14 runs or slides through the apparatus. This form of construction is of special advantage in properly supporting and guiding the mold when inverted.

The press-platen 15 is adapted to force the material through the die 13 into the molds 14. The platen 15 extends substantially across the charging chamber 7, its opposite ends being guided by a pair of angle plates $7^{a'}$ each fixed in any desired manner to the adjacent side wall of the charging chamber 7. 16 indicates as an entirety the mechanism for reciprocating the press-platen 15...

21 indicates a receiver onto which the empty molds are successively delivered or positioned ready to be moved forward to the mold filling station, as will be later set forth. The receiver preferably comprises a pair of plates $21^a$ having flanges $21^b$ on which the end blocks $14^b$ of each mold rest.

22 indicates a base or platform, the rear portion of which is arranged below the charging chamber 7. It is spaced from the die 13 a sufficient distance to permit the brick molds 14 to be moved over the base and between said platform and the lower edge of the die 13. The rear portion of the platform 22 is arranged between the supplemental frame members $1^d$. The rear end of the base 22 is preferably provided with a pair of arms $22^b$ which are adjustably and pivotally connected at or near their free ends to the frame members $1^d$ by a plurality of bolts $22^a$. The bolts $22^a$ extend through openings in the arms $22^b$ and the frame members $1^d$. The bolts $22^a$ also project through suitable elongated openings formed in the plates $21^a$ and preferably serve to connect the latter to the plates $1^d$. These connecting bolts permit the front end of the base to be raised and lowered or the entire base to be adjusted vertically. The base preferably comprises a plurality of sections as follows: a section $22^c$ arranged below the die 13 to support each mold 14 at the filling position; a section $22^d$ to support each mold 14 opposite a mold bumping mechanism, indicated as an entirety at 24; and a section $22^e$ over which the molds travel to an inverting mechanism indicated as an entirety at 25.

As shown, the receiver 21 is spaced from the rear end of the base 22 to provide a passageway 26 through which the empty molds 14 are successively passed and delivered to the receiver 21. The passageway 26 is normally closed by a gate preferably comprising two spaced arms 27 fixed to a shaft $27^a$ which is loosely mounted in lugs $27^b$ extending rearwardly from the base section $22^c$. Each arm 27 carries a foot $27^c$ which engages with the rear wall of the base section $22^c$ and limits the downward movement of the arms 27. The gate arms 27 are arranged to be swung upwardly by a moving mold 14 (see Fig. 2), whereby the latter may pass through the passageway 26. $27^d$ indicates a spring which is preferably coiled around the shaft $27^a$ for the arms 27. The spring $27^d$ is connected at one end to the shaft $27^a$ while its opposite end is connected to some suitable part of the base section $22^c$, whereby the spring tends to maintain the arms 27 in normal position.

28 indicates as an entirety auxiliary means for supporting, in coöperation with the devices $22^a$, the base or platform 22. The auxiliary supporting means 28 are preferably arranged directly below the die 13 in order to take the thrusts due to the operation of the press-platen 15 in forcing the material into the molds 14. For a detail description of the auxiliary supporting means 28, reference is made to my aforesaid application Serial No. 81,425.

The reciprocating feeder or mold push-out 23 serves to successively move the molds 14 from the mold receiving station 21 to the filling position immediately below the die 13. For the purpose of coöperation, the receiver 21 is arranged to receive and support a mold 14 as the push-out 23 is moving rearwardly but after it has passed the receiver 21, so that when the said push-out moves forward, it will engage with and move the mold 14 forwardly the desired distance. In this connection it will be understood that when the push-out 23 engages with and moves a succeeding mold, the latter in turn pushes forward the mold or molds in front of it and thereby imparts step-by-step movement to all of the molds on the base or platform 22 to deliver them first to a position where they may be operated upon by the bumping mechanism 24 and then to the inverting mechanism 25, as will be later set forth.

The bumping devices 24 are arranged between the die 13 and the inverting mechanism 25 to free or loosen the bricks from the mold walls ready for the dumping operation. The bumping devices 24 preferably operate to bump each mold while it is on the section 22$^d$ of the support or base 22. Of these devices, 24$^a$ indicates one or more transverse rods extending through a slide opening or openings 24$^b$ formed in the base or platform section 22$^d$. 24$^c$ indicates a pair of bumpers fixed in any well known manner to the opposite ends of the rod or rods 24$^a$ and arranged in a plane slightly above the platform section 22$^d$ so as to engage each mold 14 as it moves intermittently thereover. Each bumper 24$^c$ preferably comprises a base 24$^d$, a mold engaging member 24$^e$ and an adjustable intermediate member 24$^f$ to which the engaging member 24$^e$ is secured. The intermediate member 24$^f$ is preferably detachably as well as adjustably connected to the base 24$^d$. For this purpose, the intermediate member 24$^f$ is provided with an elongated slot 24$^g$ adapted to receive a bolt 24$^h$ having a clamping nut, which when tightened serves to connect the intermediate member 24$^f$ and base 24$^d$ together. The engaging surfaces between the intermediate member 24$^f$ and base 24$^d$ are preferably provided with parallel interlocking ribs and grooves (see Fig. 5) which prevent relative movement between these parts when clamped together, but permit ready adjustment both longitudinally and transversely of the rods 24$^a$, whereby the proper spacing of the bumpers 24$^c$ relative to each other and longitudinally of the platform section 22$^d$ may be effected. The bumpers 24$^c$ are reciprocated transversely of the platform section 22$^d$ by devices indicated as an entirety at 36. These reciprocating devices 36 preferably comprise a shaft 36$^a$ which may extend longitudinally of the apparatus. The shaft 36$^a$ may be mounted in a plurality of spaced bearings 36$^b$; the bearings 36$^b$ may be supported by brackets 36$^c$ secured to the adjacent side of the frame member 1$^d$ and sill 1$^a$. At its rear end, the shaft 36$^a$ is provided with a bevel gear 36$^d$ which meshes with the bevel gear 2$^i$. At its front end, the shaft 36$^a$ is provided with a crank arm 37 carrying at its free end a stud-shaft 37' on which may be pivotally mounted a polygonal block 37$^a$. 37$^b$ indicates a frame or box which is fixed to or formed integral with the adjacent bumper base 24$^d$. (See Fig. 6). On its rear side, the frame 37$^b$ is formed with a vertically extending, elongated groove or guideway 37$^c$ having parallel side walls with which the block 37$^a$ has slidable engagement. When the shaft 36$^a$ is rotated to revolve the crank 37, the block 37$^a$ slides up and down in the groove 37$^c$ as the crank moves from its highest position to its lowest position and back again, but due to the engagement of the block 37$^a$ with the side walls of the grove 37$^c$ during movement of the crank, the frame 37 and bumping mechanism are reciprocated horizontally, being guided by the rods 24$^a$ in the openings 24$^b$. The speed of the shaft 36$^a$ is such as to impart a quick reciprocating movement to the bumpers 24$^c$ in order to bump each mold back and forth between them with considerable force. The effect of this operation is to jar or knock each mold 14 with force sufficient to cause the loosening or freeing of the bricks from the walls thereof, so that when the molds are inverted by the inverting mechanism 25, the bricks will readily separate therefrom without any of their parts sticking to the mold walls, especially in the event the molds 14 have been previously sanded, as will be later set forth.

Each mold engaging member 24$^e$ is preferably pivoted loosely at 24$^{e'}$ to the adjacent member 24$^f$, to swing upwardly, as shown in dotted lines in Fig. 4, and its rear wall is inclined or beveled. In the event either of the bumping members 24$^e$ happens to be in the path of movement of a mold when the latter is being moved forwardly to the bumping position, the mold will engage the inclined wall of the member 24$^e$ and swing it upwardly without affecting its transverse movement; but as soon as the bumping member has cleared the mold, it will drop into operative position and engage the adjacent end thereof.

The shaft 36$^a$ is preferably provided with two cranks 37 which extend in opposite directions relative to the axis of the shaft. These cranks are formed with a T-groove 37$^{c'}$ to receive the head of the bolt or stud-shaft 37', and permit its movement longitudinally of the groove 37$^c$ to adjust the length of stroke imparted to the bumpers 24$^c$; or by moving the bolt 37' to the opposite side of the shaft 36$^a$, to change the direction of such stroke. The bolt 37' may be fixed in its adjusted position by a suitable nut.

Through the adjustment of the bumpers 24$^e$ on the supporting member 24$^d$ and of the bolt or shaft 37' along the cranks 37, either or both, I am enabled to so position the bumpers 24$^e$ in correlation with a mold moving forwardly relative to the base section 22$^d$, that it can be positioned between the bumpers without striking the bumping member 24ᵉ. These adjustments also permit me to so position and operate the bumping members 24ᵉ that either relatively hard or light blows may be imparted to the molds 14 as conditions may require.

38 indicates a pair of guide devices carried by and arranged at opposite sides of the base 22 between the bumping mechanism 24 and the inverting mechanism 25. The devices 38 converge toward each other and are arranged to be engaged by any mold or molds 14 which get displaced on the base 22, and move it or them inwardly or toward the longitudinal axis of the base 22 for proper delivery thereof to the inverting mechanism 25, and mold separating mechanism 48.

51, 52 indicate receiving devices for the bricks and empty molds, respectively. The receiving devices 51, 52, preferably comprise gravity conveyers.

Any suitable means may be employed for receiving the molds from the conveyer 52, sanding them and feeding them into proper position on the receiver 21.

The operation of the machine may be described briefly as follows: Starting with an empty mold 14, on the receiver 21, such mold is moved forwardly by the mold push-out 23 to a position immediately below and in registry with the die 13, as shown in Fig. 2. Thereupon the mold push-out moves rearwardly to engage a succeeding mold. In the next forward movement of the mold push-out 23 the succeeding mold is moved to a position immediately below and in registry with the die 13 and this succeeding mold engages with the first mold and moves it forward a distance equal to the width of a mold. This operation continues until the forward-most mold is delivered to the inverting mechanism 25, which at this time is open, as shown in Fig. 2, and separating mechanism 48. As each mold becomes positioned opposite the bumpers 24ᶜ during its period of rest while the mold push-out is moving rearwardly and forwardly, the bumpers 24ᶜ oscillate the adjacent mold transversely to cause loosening of the brick from the adjacent faces of the mold.

A machine of my improved construction is peculiarly adapted for making what are ordinarily known as soft mud bricks, and the construction of my mechanism is such that the mud may be worked relatively stiff, which is of great advantage in the handling and drying of the bricks, among other things, as well known to one skilled in the art.

To those skilled in the art of making apparatus of the class described, many alterations in construction and widely differing embodiments and applications of my invention will suggest themselves, without departing from the spirit and scope thereof. My disclosures and the description herein are purely illustrative, and are not intended to be in any sense limiting.

The bumping mechanism serves to impart blows to the mold in an effective manner, the result being that during the time the molds are at rest on the base 22 between the bumpers the bricks are properly loosened with respect to the mold walls, whereby upon the inversion of the molds the bricks will slide or drop by gravity therefrom, without sticking thereto, onto a pallet, which has been previously positioned on the mold.

It will therefore be seen that by means of my improved bumping mechanism, I am enabled to rapidly make bricks and to effectively bump the molds therefor, thus insuring dumping and separation of the bricks from the molds with minimum losses due to the bricks or parts thereof sticking to the mold walls.

What I claim is:

1. The combination of a support, means for filling brick molds with material, devices arranged at opposite sides of said support and movable transversely thereof for bumping the filled molds on said support during the intervals between movements thereof, each of said devices including a pivoted mold engaging member, means for feeding the molds intermittently to a position for filling by said filling means and then to a position for bumping by said bumping devices, and means for reciprocating said devices.

2. The combination of a support for filled molds, devices arranged at opposite sides of said support and movable transversely thereof for bumping the molds, each of said devices including a pivoted mold engaging member, and means for reciprocating said devices.

3. The combination of a support for filled molds, devices arranged at opposite sides of said support and movable transversely thereof for bumping the molds, each of said devices including a pivoted mold engaging member, means for feeding the molds to a position for bumping by said bumping devices, and means for reciprocating said devices.

4. The combination of a support for filled molds, means for bumping the filled molds on said support, including a slide device movable transversely of said support and a pair of mold engaging members pivoted to said slide, and means for operating said bumping means.

5. The combination of a support for filled molds, means for bumping the filled molds on said support, including a device slidably mounted on said support, mold engaging members mounted on said device and means for adjusting said members on the device at right angles to the direction in which the said members operate, and means for operating said bumping means.

6. The combination of a support for filled molds, means for bumping the filled molds on said support, including a device slidably mounted on said support, mold engaging members mounted on said device and means for adjusting said members on the device longitudinally and transversely of said support, and means for operating said bumping means.

7. The combination of a support for molds, devices, arranged at opposite sides of said support and movable transversely thereof, for bumping filled molds on said support, means for feeding the molds to a position for bumping by said devices, means, including a double crank, for reciprocating said bumping devices, and adjustable connections with said crank for varying the length of movement of said bumping devices.

8. The combination of a support for molds, devices, arranged at opposite sides of said support and movable transversely thereof, for bumping the filled molds on said support, means for feeding the molds to a position for bumping by said devices, means for reciprocating said bumping devices, said devices including a double crank formed with a slot extending from end to end thereof, and connections adjustable in said slot for connecting the crank to said devices.

9. In apparatus for making bricks, the combination of a support for molds, bumpers arranged at opposite sides of said support, means for moving the molds to a position between said bumpers, means for reciprocating said bumpers transversely of said support, and means for pivotally supporting said bumpers to permit them to be swung laterally due to engagement of a mold therewith while the latter is moving forwardly.

10. In apparatus for making bricks, the combination of a support for molds, bumpers arranged at opposite sides of said support, means for moving the molds to a position on said support between said bumpers, means for reciprocating said bumpers transversely of said support, and means for pivotally supporting said bumpers to permit them to be swung laterally due to engagement of a mold therewith while the latter is moving forwardly, the under surfaces of said bumpers being inclined downwardly and forwardly.

11. In an apparatus for making bricks, the combination of a support, means for filling molds at a predetermined position on said support, bumpers for bumping the molds after being filled, means for moving the molds to the position for filling and then to a position for bumping, means for reciprocating said bumpers transversely of said support, and means for adjusting the bumpers toward and from each other and longitudinally of said support.

12. In apparatus for making bricks, the combination of a support for molds, mechanism for bumping the molds, means for moving the molds to a position for bumping by said bumping mechanism, means for reciprocating the mold engaging elements of said bumping mechanism transversely of said support, and means for adjusting said elements toward and from each other and longitudinally of said support.

13. In apparatus for making bricks, the combination of a support for molds, bumpers arranged at opposite sides of said support and movable transversely thereof, means for successively moving the molds to a position between said bumpers, means for reciprocating said bumpers, and means for pivotally supporting said bumpers on horizontal axes to permit them to swing vertically due to engagement of a mold therewith while the latter is moving forwardly.

14. In an apparatus for making bricks, the combination of a support for molds, devices for bumping the molds, means for moving the molds to a position for bumping, means for reciprocating said bumping devices transversely of said support, means for adjusting the bumping devices toward and from each other and longitudinally of said support, and means for adjusting the throw of said devices.

15. In an apparatus for making bricks, the combination of means for filling molds with material, mechanism, including a double crank, a pair of reciprocating bumpers and connections between the bumpers and said crank, for bumping the molds after being filled, said connections being adjustable from end to end of said double crank, and means for moving the molds to the position for filling and then to a position for bumping.

16. In an apparatus for making bricks, the combination of means for filling molds with material, mechanism, including a double crank, a pair of reciprocating bumpers and connections between the bumpers and said crank, for bumping the molds after being filled, said connections being adjustable from end to end of said double crank, means for moving the molds to the position for filling and then to a position for bumping, and means for adjusting the bumpers both transversely and longitudinally of said support.

17. In an apparatus for making bricks, the combination of a support for molds, mechanism, including a double crank, a pair of reciprocating bumpers and connections between the bumpers and said crank, for bumping the molds, said connections being adjustable from end to end of said double crank, means for moving molds to a position for bumping, and means for adjusting the bumpers both transversely and longitudinally of said support and relatively to each other.

In testimony whereof, I have hereunto signed my name.

HENRY W. B. GRAHAM.